D. S. HALL.
SLEIGH.
APPLICATION FILED MAR. 9, 1908.
1,134,453.
Patented Apr. 6, 1915.
2 SHEETS—SHEET 2.
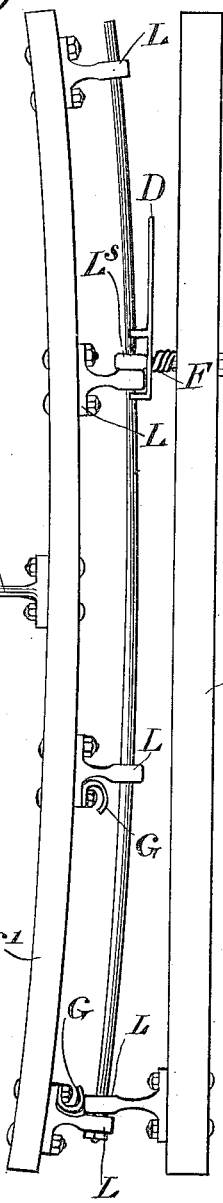
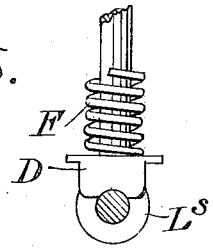
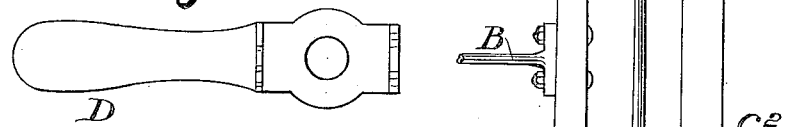
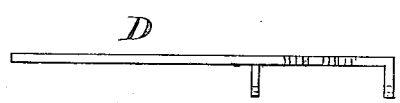
Witnesses.
Harvey Burbank
Edgar E. Badger
Inventor.
Dean S. Hall

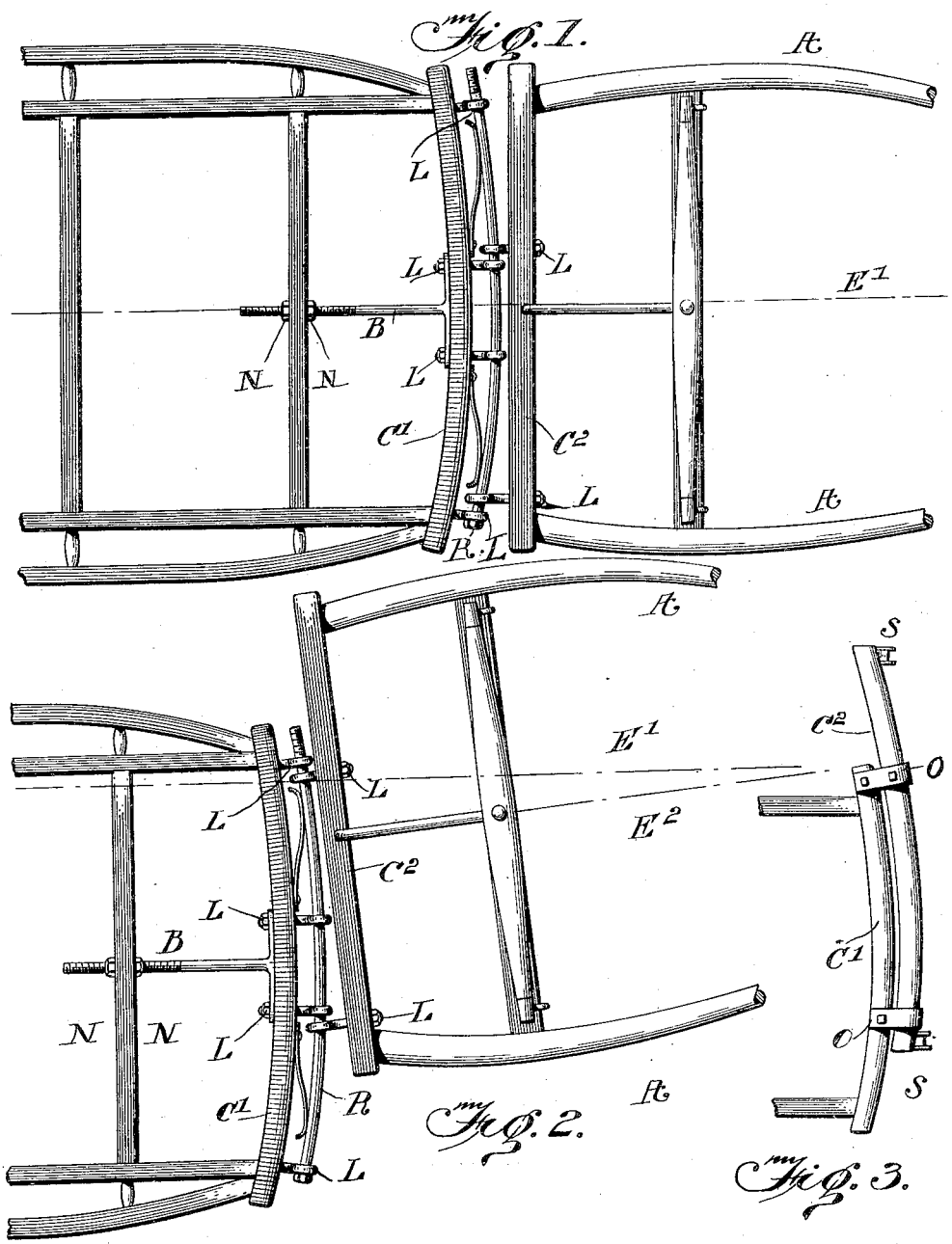

UNITED STATES PATENT OFFICE.

DEAN S. HALL, OF MARSHFIELD, VERMONT.

SLEIGH.

1,134,453.

Specification of Letters Patent.

Patented Apr. 6, 1915.

Application filed March 9, 1908. Serial No. 420,054.

*To all whom it may concern:*

Be it known that I, DEAN S. HALL, of Marshfield, in the county of Washington, and in the State of Vermont, have invented a certain new and useful Improvement in Sleighs, and do hereby declare that the following is a full, clear, and exact description thereof.

My invention relates to laterally shiftable shafts for sleighs or cutters, so that with a one horse sleigh the horse may travel either directly in front of the sleigh or to one side thereof, which last named position is desirable in heavy snows and on country roads traveled by two horse teams, so that the one horse can use the track broken by one of the two of the team, and yet the sleigh follow the tracks previously made, and the principal object of my invention is to provide a construction, which, when the horse is drawing the sleigh in a position at one side of the line of travel of the sleigh, will not result in an objectionable tendency of the sleigh to swing or twist, but on the contrary will cause it to track properly and draw easily; and will avoid undue lateral projection of the shafts beyond the side of the sleigh when the horse is traveling on one side of the center of the sleigh track.

Other objects have to do with the details of construction whereby the manipulation of the parts necessary for adjustment is facilitated, the parts are firmly held in their adjusted position and rattling of parts prevented, all as more fully hereinafter set forth.

In the accompanying drawings—Figure 1 is a top plan view of an embodiment of my invention in which the shafts are arranged for the horse to travel in the center of the road; Fig. 2 a like view thereof when the shafts are shifted to one side so as to allow the horse to travel in one of the tracks made by a two horse team, while the sleigh runs in the track made by the two horse team sleigh; Fig. 3 is a detail view showing an arrangement of parts for use with the buggy style of shafts; Fig. 4 is a detail plan view illustrating my latching device; Figs. 5, 6 and 7 are views showing the latching device in different positions.

Proceeding now with a description in detail of the structures shown in the drawings to illustrate my invention, A designates the sleigh shafts of ordinary construction having at the rear end parallel cross bars $C^2$, the forward one of which supports the swingle tree, while the rearmost one has two rearwardly projecting loops or eyes L, one at the extreme side of the shafts and the other a short distance beyond the transverse center thereof through which eyes pass, an arc shaped or curved rod R which extends from side to side of the sleigh at the front thereof where it is attached to the sleigh runners, the eyes and rod forming the customary hinged connection between the shafts and the sleigh to allow for the vertical swinging of the shafts. The center of the arc of curvature of the rod R is rearward of the front of the sleigh, so that the rod arches or bows forward and paralleling the rod R is a cross bar $C^1$ from which forwardly project eyes L through which the curved rod R passes. The loop or eye L that is toward the center of the shafts A is shorter than the loop or eye that is at the side thereof, the two eyes being so proportioned that the shafts A will extend straight ahead when the line of draft is to be parallel with the line of travel and the horse is to go in a path midway between the two runners. When it is desired to have the horse travel a path to one side of a line midway between the two sleigh runners, the shafts are shifted laterally to the position shown in Fig. 2, from which it will be seen that due to the curvature of the rod R the line of draft instead of being parallel with the tracks in which the sleigh is to run, or the line of travel is oblique thereto, and that by reason of said curvature the rear or heel portions of the shafts have a certain desired position and the forward guiding portions of the shafts project a different distance beyond the side of the sleigh than would be the case were the rod R straight and at right angles to the line of travel, and it is important to diminish the projection of the heel of the shaft as much as possible to avoid collision with other passing vehicles or objects.

To latch or lock the shafts at the desired point of adjustment, I use a latch pivoted upon one of the loops L on the rear cross bar $C^1$, which has diametrically opposite lugs that project toward the rod R and have their edges curved to interlock with the sides of the rod R when the latch is turned to a position parallel with the latter, and the latch is yieldingly held in engagement with the rod, until turned by its handle, by means of a spring F, which, of course, holds the parts with sufficient firmness to prevent rattling. The distance between the latch lugs is just enough to accommodate between them contacting loops L projecting, respectively, from the cross bars $C^1$ and $C^2$ and thereby lateral movement of the shafts is prevented. I also provide antirattling springs G, as shown in Fig. 4.

It is desirable for various reasons, such, for example, as the differing sizes of horses to alter the side adjustment of the shafts, and I readily accomplish this by varying the curve of the cross bar $C^1$ and the rod R, which may conveniently be done by attaching a rod B to the rear of the cross bar $C^1$, which thence extends through a beam of the sleigh or through an eye or loop attached thereto, and which rod B is threaded to receive nuts N by the manipulation of which the curvature of the bars $C^1$ and rod R may be changed, said bar and rod having sufficient flexibility to enable this to be done. The spring nature of the rod R and its curvature, tends to prevent rattling of the rod by reason of the tension produced by the spring nature of the rod.

As shown in Fig. 3, my invention is adapted for use with the ordinary buggy style of shafts which have but the one cross bar toward their ends which carries the swingle tree, the rear end of the shafts being provided with simple eyes S for the usual shaft coupling. In the case shown, there are two curved bars $C^1$ and $C^2$, flat or square in cross section, the bar $C^1$ being rigidly attached to the front of the sleigh and having slides or straps O riveted or bolted thereto through which the bar $C^2$ passes.

What I claim is—

1. In combination, a sleigh, a shaft structure, a means slidably connecting the shaft structure to the forward end of the body said means embodying a forwardly curved guide bar extending transversely of the vehicle, whereby the shaft structure may be adjusted to a position in line with the travel of the vehicle or to a position oblique thereto, for the purpose set forth.

2. In combination, a sleigh structure, a shaft structure, and means connecting the shaft structure to the sleigh structure, whereby the shaft structure may be adjusted centrally in line with the line of travel or slid to one side to a position oblique to the line of travel, said means embodying a rod or bar extending transversely of the vehicle and devices for rigidly attaching it to one of the structures and means for slidingly connecting the other structure to the rod or bar, for the purpose set forth.

3. In combination, a sleigh forming one element, a shaft structure forming another element, and means connecting the shaft structure to the sleigh whereby the shaft structure may be adjusted centrally in line with the line of travel, or slid to one side to a position oblique to the line of travel, said means embodying a rod or bar extending transversely of the vehicle and devices for rigidly attaching it to one of said elements and means for slidingly connecting the other of said elements to the rod or bar, for the purpose set forth.

4. In combination, a sleigh carrying at its forward end a transverse guide rod curved forwardly and adapted to be flexed to have its curvature changed, and means on the sleigh for varying the curvature of the bar and holding it at the degree the curvature is adjusted to, and a shaft structure slidingly connected to said rod.

5. In combination with a sleigh having a curved bar mounted at its forward end and adapted to be flexed slightly, a guide rod curving forwardly and mounted on the front side of said bar, means connecting said curved bar and the sleigh and adapted to flex the bar and the rod carried thereby, and a shaft structure slidingly connected to said rod.

6. In combination a sleigh, a shaft structure, means for connecting the same together embodying a transverse forwardly curved rod and eyes or loops mounted on the shaft structure and the sleigh, one set of said eyes or loops being adapted to slide on said rod, and a latch mounted on one of said eyes or loops and adapted to rotate vertically and provided with a pair of lugs one at either side of the eye, for the purpose set forth.

DEAN S. HALL.

Witnesses:
FRITZ W. JACKSON,
EUGENE A. PRINDLE.

Copies of this patent may be obtained for five cents each, by addressing the "Commissioner of Patents, Washington, D. C."